July 9, 1935.  S. B. TERRY  2,007,840
THICKNESS GAUGE
Filed May 9, 1932  3 Sheets-Sheet 3

INVENTOR
Spencer B. Terry
BY
Joseph F. Schofield
ATTORNEY

Patented July 9, 1935

2,007,840

UNITED STATES PATENT OFFICE 2,007,840

THICKNESS GAUGE

Spencer B. Terry, West Hartford, Conn., assignor to Pratt & Whitney Company, Hartford, Conn., a corporation of New Jersey Application May 9, 1932, Serial No. 610,054

8 Claims. (Cl. 33—148)

This invention relates to dimension gauges and particularly to a thickness gauge adapted to permit continuous gauging operations on moving strips or sheets of thin materials.

A primary object of the invention is to provide a device having opposed contact members adapted to engage opposite surfaces of the moving material being gauged, these members being mounted for free movement in one direction so that they may accommodate themselves to varying positions of the material being gauged.

Another object of the invention is to provide means for accurately determining minute variations in thickness of a metal sheet or strip as it passes between gauging members or rolls during the process of manufacture or after it has been rolled to final dimension and is being wound upon a suitable drum.

One feature of advantage of the invention is that the gauge may be adjusted for any predetermined thickness of material to be gauged, variations in thickness of the sheet from that predetermined thickness being indicated to very fine limits while the sheet is continuously passing through the gauging or contacting members.

And finally it is an object of importance to provide adjusting means for initially setting the gauge for different thicknesses of material that will be simple to position and which will be adapted to accurately position the gauging members for any predetermined thickness.

With these and other objects in view my invention includes the features of construction and operation set forth in the following specification and illustrated in the accompanying drawings.

In the accompanying drawings annexed hereto and forming a part of this specification, I have shown my invention embodied in a form of gauge adapted to contact with opposite surfaces of and determine variations in thickness of a wide sheet of thin flexible material such as sheet metal, etc., as it is being finally rolled, but it will be understood that the invention can be otherwise embodied and that the drawings are not to be construed as defining or limiting the scope of the invention, the claims appended to this specification being relied upon for that purpose.

Figure 1:
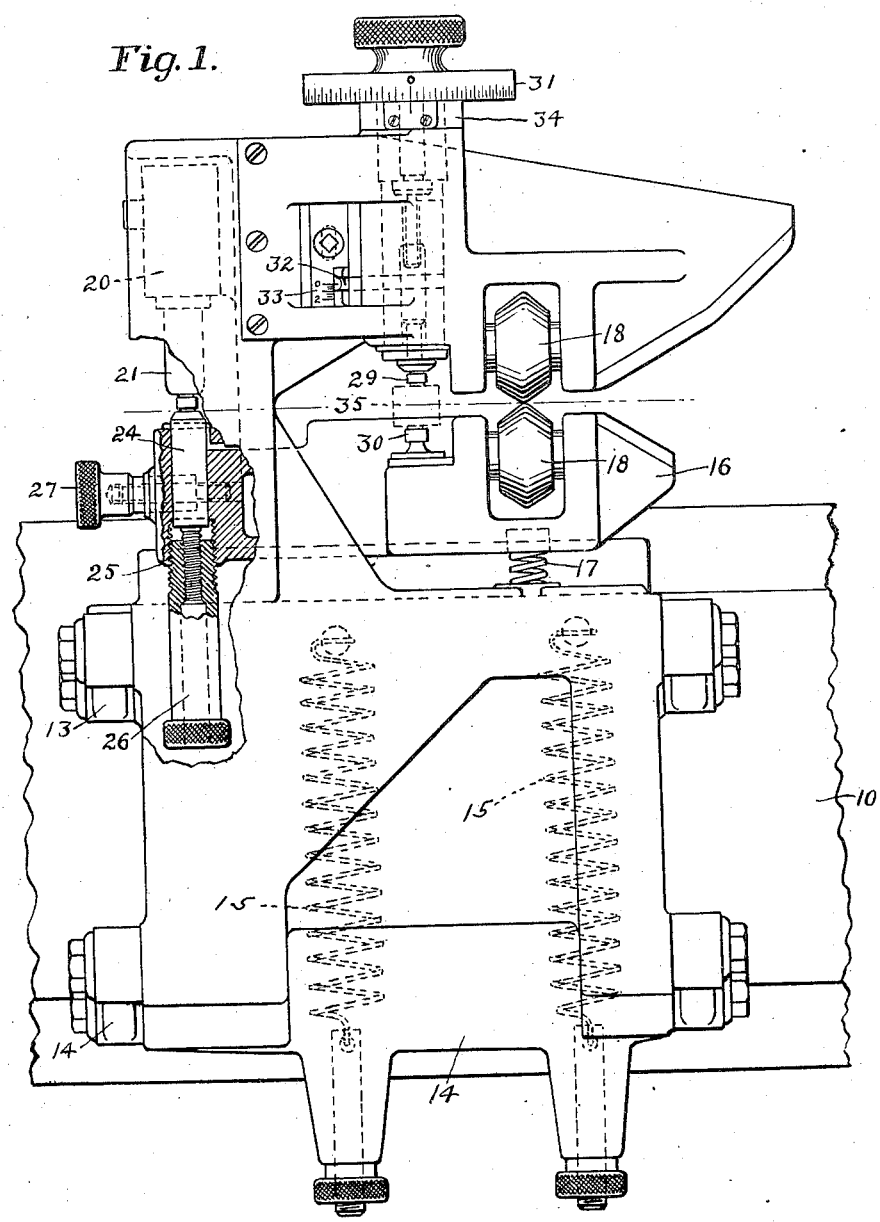
Figure 1 is a front elevation of a complete gauging head or unit forming the present invention.
Figure 2:
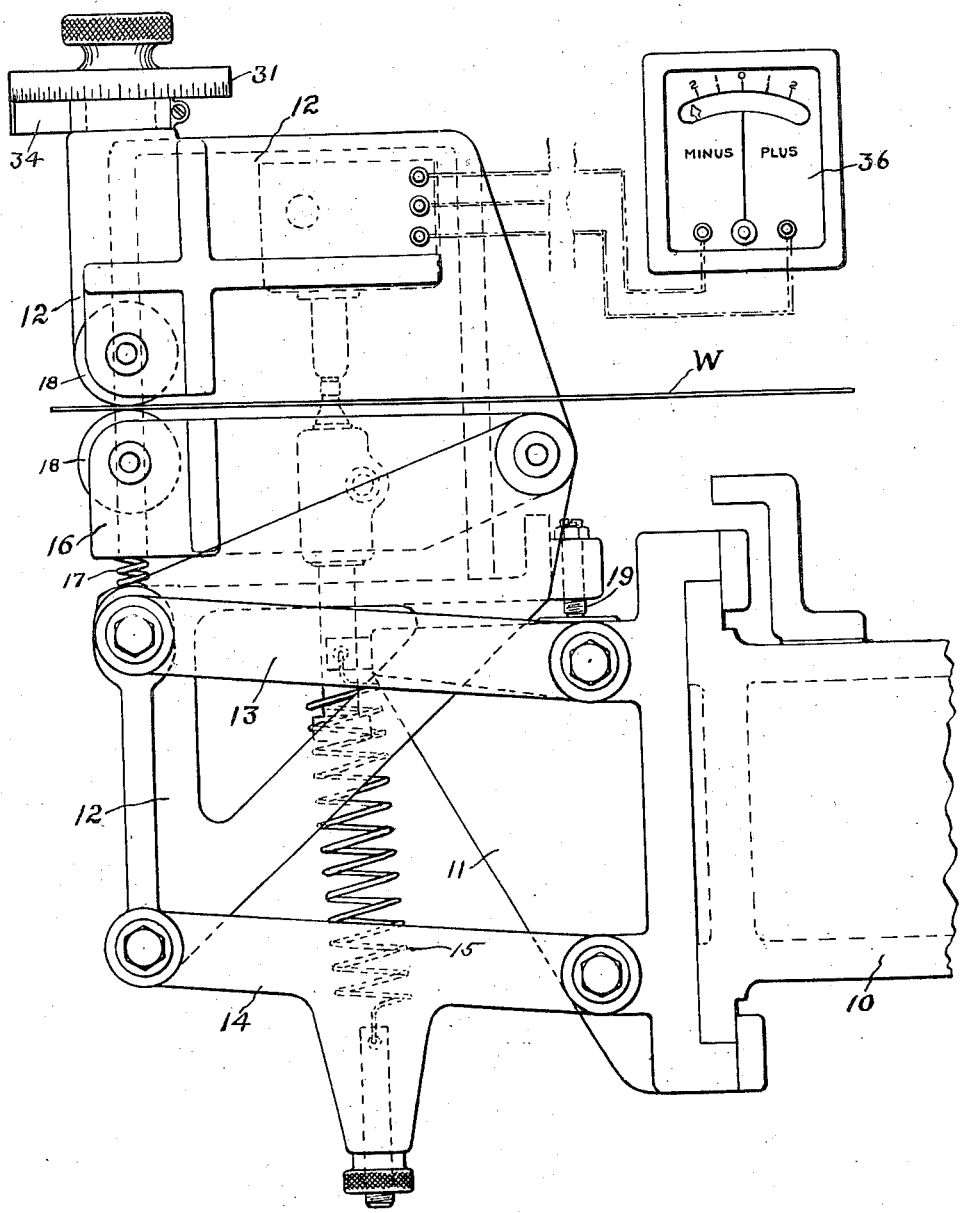
Fig. 2 is a side elevation of the gauge taken from the right hand side of Fig. 1 showing the complete head or unit with a sheet of material being gauged.

In the above mentioned drawings I have shown but one embodiment of the invention which is now deemed preferable but it is to be understood that changes and modifications may be made within the scope of the appended claims without departing from the spirit of the invention.

In gauging thin strips or sheets of metal such as steel, copper, aluminum, or other flexible material, it is highly desirable to determine the uniformity of thickness as the strip comes from the final rolling operation and is being wound upon a suitable drum or reel. For that purpose the present invention provides a gauging device which may be fitted to or associated with one of the frames of a rolling mill and have its gauging elements engage over one edge of the strip being rolled, the position of the gauging rolls being a material distance from the edge of the strip. Variations in thickness of the material are indicated by variations in the position of the pointer on an electrical indicating instrument associated with the gauge. The gauging device forming the present invention is designed to indicate variations of less than one hundred thousandth of an inch from a predetermined thickness for which the gauge is set. Preferably the heads are used in pairs one extending over each edge of the moving strip being gauged.

Briefly and in its preferred aspect my invention may include the following principal parts: A support, a gauging head mounted thereon for free movement in one plane, a pivotal arm mounted on said head, gauging members mounted respectively on said head and pivotal arm in opposed relation to each other, a measuring screw and graduated dial rotatable together in said head and cooperating with an anvil on said arm to determine the preliminary adjustment of the gauging members, and an adjustable anvil on said pivoted arm contacting with the movable anvil of an electrical gauge on said head, this gauge having an electrical indicating instrument associated therewith.

Referring more in detail to the figures of the drawings, I show a support 10 forming a portion of one of the frames adjacent a rolling machine or other device adjacent the path of movement of the strip W to be gauged. On this support 10 and preferably adjustable laterally to accommodate varying widths of strip is a bracket 11 to which is pivotally mounted a system of parallel linkage for the gauging head 12. Two of the links 13 are provided, one on each side of the gauging head 12. The link 14 below links 13 is in the form of a member pivotally attached as shown to the bracket 11 and to the head 12. The gauging head 12 which forms the base member of the gauging device therefore may be moved substantially vertically relatively to its bracket 11 and always remain in proper position to the strip W being gauged. In order to counterbalance the weight of the gauging head 12 springs 15 may be disposed between a portion of the bracket 11 and a portion of a lower plate 14 forming the lower part of the linkage. With this counterbalancing effect of the springs 15 when properly adjusted by the screw as shown the gauging head 12 is free to float up and down within wide limits. The gauging device may therefore adjust itself freely to differing vertical positions of the strap W as the diameter of a roll on which it may be wound increases.

Pivotally mounted upon a horizontal axis within the gauging head 12 is an arm 16 spring pressed upwardly preferably by a suitable coil spring 17. Mounted in opposed relation to each other are freely rotatable gauging members in the form of rollers 18, one being mounted in the gauging head 12 and the other directly below this roller at the free end of the pivotally mounted arm 16. These rollers 18 are so disposed that the strip or sheet being gauged may pass freely between them, the rollers 18 being laterally overhung from the connecting portions of the gauging head 12 and its support for that purpose. To limit the lowermost position of the head 12 a stop 19 may be provided adapted to contact with a surface of the bracket 11.

Figure 4:
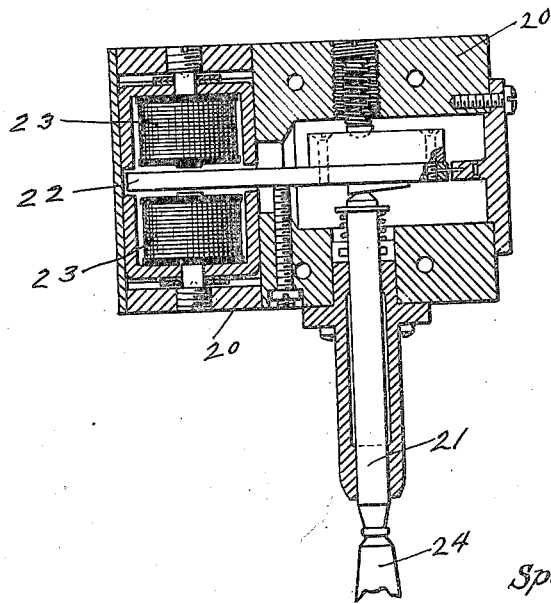
Fig. 4 is a cross sectional view upon an enlarged scale of the electrically operated gauging anvil and connected parts within the body member or head of the gauge.

At one side of the gauging head 12 within a housing 20 attached to the head 12 is mounted an anvil 21 shown most clearly in Fig. 4. This anvil 21 is movable vertically within very slight distances, this slight vertical movement varying the position of a flexibly supported armature 22 within the housing 20 between two oppositely disposed induction coils 23. Adapted to contact with the lower end of the anvil 21 is a manually adjustable anvil 24 mounted within the pivotally mounted arm 16. Preferably this anvil 24 is provided with a threaded portion 25, the position of the anvil 24 vertically being varied by rotation of another threaded member 26, its threads having a slightly different lead and being of opposite hand from the threaded portion 25. A clamping screw 27 permits the anvil 24 to be locked in any adjusted position. It will presently be described how variations in thickness of the strip W may be gauged while these contacts 21 and 24 remain in contact one with the other, the gauging being determined by the effect of varying positions of the armature 22 relative to its opposed coils upon an electric circuit. This circuit for the coils 23 includes a microammeter or other sensitive electric indicating instrument, referred to hereafter.

Figure 3:
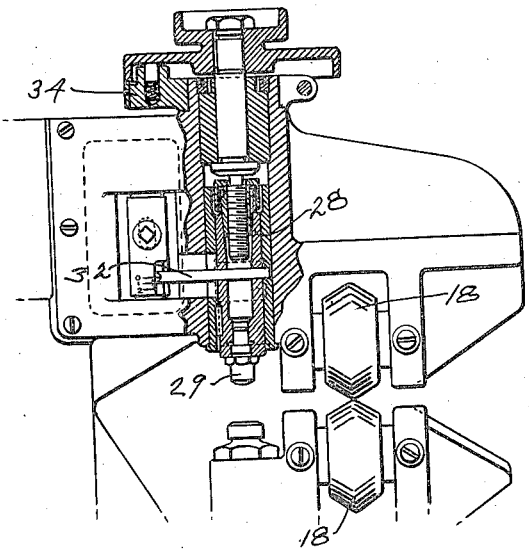
Fig. 3 is a front elevation of a portion of the gauge showing the graduated dial, the measuring spindle and setting means therefor in section.

On the gauging head 12 and disposed adjacent the contacting rollers 18 is a precision measuring spindle 28, the lower end of which has an anvil 29 which is directly opposed to a fixed anvil or abutment 30 within the pivotal arm 16. The measuring spindle 28 which is shown most clearly in Fig. 3 is of any standard or usual construction so that rotation of a graduated dial 31 fixed upon the upper end of the spindle 28 raises and lowers the anvil 29 relative to the gauging head 12. A pointer 32 carried by the spindle 28 and extending over a scale 33 on the head 12 serves to determine the number of complete rotations of the graduated dial 31. A zero reference line on an arm 34 extending from the head 12 is disposed closely adjacent the graduated dial 31 and may be adjustably positioned rotatively so that the zero reading may be set conveniently.

It will be noted that the anvils 29 and 30 are widely separated when the gauging rollers 18 are in contact and that during the setting of the gauge as hereafter described a gauge block 35 of predetermined height is interposed between anvils 29 and 30. This is for the purpose of positioning the anvils 29 and 30 out of the path of movement of the strip being gauged and thus preventing them from being injured by contact with the moving strip W.

The gauge is placed in proper adjustment for operation by placing a gauge block 35 of predetermined thickness upon the anvil 30 below the measuring spindle 28 and adjusting the spindle 28 to read zero. In this adjustment of the measuring spindle 28 the gauging rollers 18 should be just in contact so that one roller 18 when rotated will rotate the other roller 18. Should the rollers 18 not be in contact the spindle 28 is adjusted until the rollers 18 just contact one with the other after which the zero arm 34 and pointer 32 may be adjusted so that the graduated dial 31 on the measuring spindle 28 and the scale 33 on the head will read zero.

To set the gauge for gauging any predetermined thickness after having adjusted the spindle 28 relative to the rollers 18 as above described, it is necessary first to adjust the measuring spindle 28 to the required dimension corresponding to the thickness of the strip being gauged. This is done with the gauging block 35 interposed between the anvils 29 and 30. The adjustable anvil 24 contacting with the anvil 21 associated with the electromagnetic armature 22 is then adjusted until the position of the armature is such that the pointer of the indicating instrument 36 will be in the center of its scale. After removing the gauge block 35 from between the anvils 29 and 30 the gauge is in condition for operation upon the thickness for which it is adjusted. Variations in the thickness of the strip W, which will cause relative separating or approaching movements of the rollers 18 and therefore of slight movements between the anvils 21 and 24, will be indicated upon the scale of the instrument 36.

As the electric circuit employed in connection with the anvil 21 and its head 20 and the form of the ammeter or other form of electrical indicating instrument 36 forms no part of the present invention the electric circuit for determining the position and movements of the armature 22 is not thought to require description. This circuit is or may be generally similar to that shown in the patent to Mershon 1,640,464 granted August 30, 1927, but any circuit having opposed induced currents affected by the relative position of an armature may be employed. It will be sufficient to state that induced currents are set up in different branches of the circuit, these branches including windings respectively around the electromagnets 23 within the head 20. The intensities of these induced currents in the two branches are influenced by the varying distances of the armature from the two oppositely positioned electromagnets. These variations in currents in the two branches serve to deflect the pointer of the instrument 36 and thus visually indicate variations in the separation of the gauging rollers 18.

What I claim is:

1. A thickness gauge comprising in combination, a base member, a contact member thereon, an arm pivotally connected to said base member, a contact member on said arm opposed to the contact member on said base member whereby material being gauged may be continuously passed directly between said contact members, means including a measuring spindle having a graduated dial thereon for setting said arm relative to said base member for predetermined distances between said contact members, and supplemental anvil means to determine variations in separation of said contact members greater or less than said predetermined distance continuously during the gauging operation.

2. A thickness gauge comprising in combination, a base member, supporting means therefor permitting free vertical movement thereof, a contact member on said base member, an arm pivotally connected to said base member and normally forced toward said base member, a contact member on said arm opposed to the contact member on said base member whereby material being gauged may be continuously passed directly between said contact members, means including a measuring spindle having a graduated dial thereon for setting said arm relative to said base member for any gauging dimension, and a supplemental anvil movable during gauging operations whereby movements thereof may determine variations in separation of said contact members greater or less than said gauging dimension during the gauging operation.

3. A thickness gauge comprising in combination, a base member, a contact member thereon, an arm pivotally connected to said member, a contact member on said arm whereby material being gauged may be passed between said contact members, cooperating anvils respectively on said base member and arm laterally spaced from said contact members, means including a measuring spindle having a graduated dial thereon for setting said arm relative to said base member for predetermined gauging dimensions, and indicating means including an armature associated with said anvils for determining the separation of said contact members.

4. A thickness gauge comprising in combination, a base member, a contact member thereon, an arm pivotally connected to said base member, a contact member on said arm directly opposed to the contact member on said base member whereby material being gauged may be passed between said contact members, said head being mounted for free movement in one direction, means including a measuring spindle having a graduated dial thereon for setting said arm relative to said base member for predetermined distances between said contact members, and supplemental cooperating anvils respectively on said head and arm to determine variations in separation of said contact members greater and less than said gauging distance continuously during the gauging operation.

5. A thickness gauge comprising in combination, a base member, a rotating contact member thereon, an arm pivotally connected to said base member, a rotating contact member on said arm directly opposed to the contact member on said base member whereby material being gauged may be continuously passed between said contact members, a measuring spindle on said base member an anvil fixed to said arm adapted to cooperate with said spindle in initially setting the gauge, an anvil on said arm adapted to contact with a supplementary anvil on said base member having limited movement during the gauging operation, and electrical indicating means to determine the position of said last mentioned anvil during the gauging operation.

6. A thickness gauge comprising in combination, a base member, a contact member thereon, an arm pivotally connected to said base member, a contact member on said arm directly opposed to the contact member on said base member whereby material being gauged may be passed between said contact members, means including a measuring spindle on said base member and a cooperating anvil on said arm for adjusting the gauge for a predetermined gauging dimension, an armature pivotally mounted within said base member between opposed induction coils and having an anvil movable therewith, and a fixed anvil on said arm adapted to contact with said anvil movable with said armature during the gauging operation, said last mentioned pair of anvils being laterally spaced from said measuring spindle and contact members, and electric indicating means to determine the position of said armature during the gauging operation.

7. A thickness gauge comprising in combination, a base member, a rotating contact member thereon, an arm pivotally connected to said base member, a rotating contact member on said arm directly opposed to the contact member on said base member whereby material being gauged may be passed continuously between said contact members, a measuring spindle on said base member, a cooperating anvil on said arm whereby the gauge may be preliminarily adjusted for predetermined distance between said contact members, a flexibly mounted member within said base member and having an anvil associated for movement therewith, an anvil on said arm adapted to continuously contact with said last mentioned anvil during the gauging operation, and indicating means to determine the position of said flexibly mounted member during the gauging operation.

8. A thickness gauge comprising in combination, a base member, a contact member thereon, an arm pivotally connected to said base member, a contact member on said arm directly opposed to the contact member on said base member whereby material being gauged may be passed between said contact members, opposed induction coils mounted in said base member having an armature flexibly mounted between them, an anvil in said base member movement of which moves said armature, an anvil in said arm opposed to and in contact with said anvil in said base member whereby movements of said arm toward and from said base member will cause movements of said anvil and armature, and electric indicating means operated by movement of said armature to determine variations in separation of said contact members during the gauging operation.

SPENCER B. TERRY.